United States Statutory Invention Registration [19]

[11] Reg. Number: H1000

Patel et al. [43] Published: Dec. 3, 1991

[54] WATER BASED SYNTHETIC HYDROCARBON DRILLING FLUID AND SPOTTING FLUID

[75] Inventors: Arvind D. Patel; Raymond E. McGlothlin, both of Houston, Tex.

[73] Assignee: M-I Drilling Fluids Company, Houston, Tex.

[21] Appl. No.: 568,074

[22] Filed: Aug. 16, 1990

Related U.S. Application Data

[63] Continuation-in-part of Ser. No. 535,110, Jun. 8, 1990, which is a continuation-in-part of Ser. No. 503,304, Mar. 30, 1990, abandoned.

[51] Int. Cl.[5] ..... C09K 7/06; C09K 7/02

[52] U.S. Cl. ..... 507/103; 166/301; 507/116; 507/134; 507/135; 507/136; 507/138; 507/139; 507/905

[58] Field of Search ..... 252/8.51, 8.511, 8.513, 252/8.515; 166/301

[56] References Cited

U.S. PATENT DOCUMENTS

| | | | |
|---|---|---|---|
| 2,222,949 | 11/1940 | Henkes | 252/8.515 |
| 2,316,967 | 4/1943 | Miller | 252/8.51 |
| 2,316,968 | 4/1943 | Miller | 252/8.51 |
| 2,500,163 | 3/1950 | Garwood | 585/18 |
| 2,698,833 | 1/1955 | Wilson | 252/8.51 |
| 3,108,068 | 10/1963 | Weiss et al. | 252/8.51 |
| 3,217,802 | 11/1965 | Reddie et al. | 166/312 |
| 3,396,105 | 8/1968 | Burdyn et al. | 252/8.51 |
| 4,208,285 | 6/1980 | Sample | 175/206 X |
| 4,212,794 | 7/1980 | Grodde et al. | 252/8.51 X |
| 4,263,465 | 4/1981 | Sheng et al. | 585/18 |
| 4,282,392 | 8/1981 | Cupples et al. | 585/10 |
| 4,374,737 | 2/1983 | Larson et al. | 252/8.51 |
| 4,387,514 | 6/1983 | McCaskill | 175/206 X |
| 4,427,564 | 1/1984 | Brownawell | 252/8.514 X |
| 4,436,636 | 3/1984 | Carnicom | 252/8.51 |
| 4,464,269 | 8/1984 | Walker et al. | 252/8.551 |
| 4,502,963 | 3/1985 | Harmon | 252/8.51 |
| 4,525,285 | 6/1985 | Son et al. | 252/8.51 |
| 4,587,368 | 5/1986 | Pratt | 585/12 |
| 4,614,235 | 9/1986 | Keener et al. | 166/301 |
| 4,631,136 | 12/1986 | Jones | 252/8.51 |
| 4,787,990 | 11/1988 | Boyd | 252/8.511 |
| 4,830,765 | 5/1989 | Perricone et al. | 252/8.51 |
| 4,876,017 | 10/1989 | Trahan et al. | 252/8.51 |
| 4,964,615 | 10/1990 | Mueller et al. | 252/8.515 |

FOREIGN PATENT DOCUMENTS

| | | |
|---|---|---|
| 89300524.9 | 7/1989 | European Pat. Off. . |

*Primary Examiner*—John S. Maples
*Assistant Examiner*—Chhaya Sayala
*Attorney, Agent, or Firm*—Arnold, White & Durkee

[57] ABSTRACT

The present invention relates to an improved water based drilling fluid and an improved spotting fluid utilizing unhydrogenated synthetic hydrocarbon compositions which are non-polluting and minimally toxic. The invention provides excellent drilling fluid properties under a wide variety of drilling conditions. The synthetic hydrocabons are selected from the group consisting of branched chain oligomers synthesized from one or more olefins containing a $C_2$ to $C_{14}$ chain length and wherein the oligomers have an average molecular weight of from 120 to 1000. The compositions of these hydrocarbons are free of aromatics and petroleum based toxic impurities. The synthetic hydrocarbons are unhydrogenated.

31 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WATER BASED SYNTHETIC HYDROCARBON DRILLING FLUID AND SPOTTING FLUID

CROSS-REFERENCE TO RELATED APPLICATION

This application is a continuation-in-part of commonly assigned co-pending patent application U.S. Ser. No. 535,110 filed June 8, 1990, which is a continuation-in-part of commonly assigned copending patent application U.S. Ser. No. 503,304 filed March 30, 1990, now abandoned.

BACKGROUND OF THE INVENTION

The invention relates to improved drilling fluids used in the drilling of subterranean oil and gas wells as well as other drilling fluid applications and drilling procedures. The term "drilling fluid" should be understood to include fluids commonly referred to as spotting fluids. The invention is particularly concerned with non-polluting, minimally toxic drilling fluids which [are based on] include synthetic hydrocarbons, having molecular weights of from 120 to 1000, derived from olefinic monomers and displaying functional characteristics, e.g., viscosity characteristics, acceptable in drilling fluid applications. The olefinic monomers are selected from the group having a carbon chain from $C_2$ to $C_{14}$ and having at least one polymerizible double bond. The oligomeric or polymeric synthetic hydrocarbons thus obtained from olefins exhibit minimal toxicity toward aquatic life and possess valuable rheological properties when used in drilling fluids.

In rotary drilling there are a variety of functions and characteristics that are expected of a drilling fluid ("drilling mud" or simply "mud"). The drilling fluid is expected to carry cuttings from beneath the bit, transport them up the annulus, and permit their separation at the surface while at the same time the rotary bit is cooled and cleaned. A drilling mud is also intended to reduce friction between the drill string and the sides of the hole while maintaining the stability of uncased sections of the borehole. Likewise the drilling fluid is formulated to prevent unwanted influxes of formation fluids from permeable rocks penetrated and likewise to form a thin, low permeability filter cake which seals pores and other openings and formations penetrated by the bit. Finally, the drilling fluid is used to collect and interpret information available from drill cuttings, cores and electrical logs.

Drilling fluids are typically classified according to their base material. In water based muds, solid particles are suspended in water or brine. Oil can be emulsified in the water. Nonetheless, the water is the continuous phase. Oil based muds are exactly the opposite. Solid particles are suspended in oil and water or brine is emulsified in the oil and therefore the oil is the continuous phase. The final class of drilling fluids are pneumatic fluids in which drill cuttings are removed by a high velocity stream of air or natural gas.

On both offshore and inland drilling barges and rigs, drill cuttings are conveyed up the hole by a drilling fluid. Water based drilling fluids may be suitable for drilling in certain types of formations; however, for proper drilling in other formations, it is desirable to use an oil base drilling fluid. With an oil base drilling fluid, the cuttings, besides ordinarily containing moisture, are necessarily coated with an adherent film or layer of oily drilling fluid which may penetrate into the interior of each cutting. This is true despite the use of various vibrating screens, mechanical separation devices and various chemical and washing techniques. Because of pollution to the environment, whether on water or on land, the cuttings cannot be properly discarded until the pollutants have been removed.

One method to accomplish the pollutant removal has been placing the screened cuttings in a standpipe or other vessel filled with sea water and periodically skimming off the layer of displaced oil as it rises to the surface in the vessel. Another method attempted is burning, i.e., oxidatively incinerating, the oil from the cuttings. Still another method is physically transporting the oily cuttings to a remote site for subsequent disposal. In each instance the method of disposal of the cuttings has proved ineffective and inefficient.

The problems associated with the environmental compatibility of drill cuttings, and the chemicals contained therein, [has] have long been recognized as a problem in the oil and gas exploration industry. Typically the approaches for solving the environmental compatibility problems have involved the physical treatment of the drill cuttings, see for example U.S. Pat. No. 4,208,285 wherein an apparatus is provided for removing volatile materials from drill cuttings by vaporizing the materials on the cuttings in a non-oxidative atmosphere and U.S. Pat. No. 4,387,514 which provides a method and apparatus for drying oil well drill cuttings to eliminate pollution causing organic materials from the cuttings.

It is apparent to anyone selecting or using a drilling fluid for oil and gas exploration that an essential component of a selected fluid is that it be properly balanced to achieve the necessary characteristics for the specific end application. As stated hereinabove, the typical compositions include oil based muds, water based muds and pneumatic fluids. For purposes of this application, only oil and water based mud systems will be relevant. The vast majority of oil and gas exploration is done with water based muds. The primary reason for this preference is price and environmental compatibility. Traditional oil based muds made from diesel or mineral oils, while being substantially more expensive than water based drilling fluids, are environmentally incompatible. As a result, the use of oil based muds has been historically limited to those situations where they are necessary.

This long felt need in the oil and gas exploration industry for an environmentally acceptable drilling fluid which either is an oil based drilling fluid or performs as an oil based drilling fluid has now been achieved by applicants' invention. By use of applicants' invention and the incorporation of synthetic hydrocarbons into a water based drilling fluid system, the functional characteristics of an oil based drilling system are achieved while the environmental compatibility of conventional water based systems is attained. Such a result has until recently been thought theoretically and practically impossible.

As can be seen from the above, the development of a drilling fluid that exhibits desirable characteristics of both a water based and oil based drilling fluid has long been an unachieved goal of the oil and gas exploration industry. With the practice of applicants' invention this goal has been realized.

Prior Art

In the drilling of wells to recover hydrocarbons and gas from subterranean deposits, it is common practice to use a rotary drilling procedure. The drill bit cuts into the earth, causing the cuttings to accumulate as drilling continues. The drilling fluid is used to carry these cuttings to the surface where they are separated and removed. The drilling fluid is recirculated through the drill pipe at the drill bit to carry out new cuttings. Thus, the bottom of the hole is kept clean and free of cuttings at all times.

Although aqueous-based drilling fluids which utilize water, brine or sea water as the primary liquid phase are dominant throughout much of the drilling industry, various oil based drilling fluids have been developed and are used in the field. These oil based drilling fluids utilize hydrocarbons such as diesel and mineral oils as the continuous phase.

Oil muds typically have excellent lubricity properties in comparison to water based muds, which reduces sticking of the drillpipe due to a reduction in frictional drag. Since few if any oil wells are truly vertical there is always frictional contact between the drill string and borehole. Frictional contact requiring excess torque output from motors is undesirable. The lubricating characteristics ("lubricity") of the drilling mud provides the only known means for reducing the friction. Oil muds in general have better lubricity than water based muds. Additionally, the oil based muds are beneficial to shale stabilization, thus, use of oil muds is quite common in wells with troubled shale zones. The use of oil muds is also common in high temperature wells because oil muds exhibit desirable rheological properties over a wider range of temperatures than water base muds.

Although oil based muds have performance characteristics distinct from water based muds, some of which are considered advantageous, there are various disadvantages such as cost, fire hazard, difficulty of mixing the mud, and environmental incompatibility effects. Among the disadvantages characteristic of oil muds, the single overriding detrimental effect is the environmental pollution effect associated with both onshore and offshore drilling operations. The cleanup of accidental discharge of oil muds in offshore environments is expensive and necessary due to toxicity of oil muds to aquatic life. Currently, in the U.S., cuttings drilled using oil based muds are required to be disposed of in an environmentally acceptable fashion, most of which are more expensive and more inconvenient than disposal methods for water based drilling fluids.

Such oil based drilling fluids are described, for instance, in U.S. Pat. Nos. 2,222,949, 2,316,967, 2,316,968 and 2,698,833. These patents describe the use of non-aqueous drilling fluids using diesel oil as the carrier or continuous phase. Several other publications describe the use of mineral oils for low toxicity oil muds. However, mineral oils that were once considered to be toxicologically and environmentally superior to diesel oil, are now also considered to be relatively toxic under increasingly stringent environmental regulations. Several attempts to develop modified non-polluting fluids have been made (U.S. Pat. Nos. 4,631,136; 4,830,765). These are not true hydrocarbon fluids and require an aqueous continuous phase which does not provide desirable functional characteristics, for instance, shale stability derived with oil based muds.

Strict regulations are imposed by governmental regulatory agencies especially in light of what are generally viewed as environmental disasters involving oil spills. These regulations have not only made the use of oil based drilling fluid more costly but in some places difficult or impossible to use in compliance with regulatory guidelines. Environmental concerns have prompted the development of a new environmentally acceptable drilling fluid that performs as an oil based drilling fluid but which is in fact a water based drilling fluid. This water-based drilling fluid is designed to be essentially non-polluting, nontoxic and safe to aquatic life. Pollution is usually defined as a sheen, film or discoloration of surface water formed by drilling fluids. The U. S. Environmental Protection Agency ("EPA") has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis Bahia)" 1984 EPA-600/3-84-067. Such report is hereby incorporated by reference.

For purposes of understanding the term "minimal toxicity" within the context of this application it refers to an $LC_{50}$ of greater than 30,000. Although 30,000 has been the number used for purposes of evaluation it should not be considered a limitation on the scope of this invention. Other $LC_{50}$ values may be viable in various environmental settings. An $LC_{50}$ value of greater than 30,000 has been equated to an "environmentally compatible" product.

It has been known for some time that synthetic water-dispersable polymers could be used as drilling fluid components. In general, acrylic polymers and alkylene oxide polymers have been described as being useful in drilling muds. See Darley and Gray, "Composition and Properties of Drilling and Completion Fluids," Gulf Publishing Co., Fifth Edition, pp. 576–580. However, no prior art disclosure mentions or appreciates the essential molecular weight and chain length requirements of applicants' invention. The prior art materials do not possess the essential toxicity and environmental compatibility of applicants' invention and typically require saturation.

U.S. Pat. No. 4,876,017 issued Oct. 24, 1989 discloses a synthetic hydrocarbon compound, in particular polyalphaolefin, to be used in a water based drilling fluid as a downhole lubricant. According to the disclosure, the resulting material is non-toxic to marine life and does not produce a sheen on a water surface when dumped into a body of water. The compound also serves as a spotting fluid for the removal of lodged tools downhole. U.S. Pat. No. 4,876,017 does not disclose or appreciate a synthetic hydrocarbon oil having a desired molecular weight range or a synthetic hydrocarbon oil synthesized from olefinic monomers of a desired chain length. The present invention discloses a synthetic hydrocarbon oil having an average molecular weight of from about 120 to about 1000 and being synthesized from one or more olefinic monomers having a chain length of $C_2$ to $C_{14}$.

Furthermore, U.S. Pat. No. 4,876,017 explicitly limits itself to saturated synthetic oils. Economically, saturated synthetic oils are expensive to manufacture since they require hydrogenation of the unsaturated oligomers. The present invention is not limited to saturated synthetic oils as some embodiments include the use of non-hydrogenated synthetic oil. By relying on non-hydrogenated olefin oligomers, these embodiments can provide the same non-toxic qualities at a fraction of the cost. Other embodiments of this invention include using the unsaturated synthetic hydrocarbon, as the continuous phase of a spotting fluid.

SUMMARY OF THE INVENTION

The present invention relates to an essentially non-polluting, substantially non-toxic water based drilling fluid with an unsaturated synthetic hydrocarbon component. The synthetic hydrocarbons that are useful in the practice of this invention are branched chain oligomers synthesized from one or more olefins (unsaturated hydrocarbons) containing a $C_2$ to $C_{14}$ chain length and wherein the oligomers have an average molecular weight of from 120 to 1000. In the preferred embodiments of this invention the synthetic hydrocarbons are branched chain oligomers synthesized from one or more olefins containing a $C_2$ to $C_{12}$ chain length and wherein the oligomers have an average molecular weight of from 160 to 800. In the most preferred embodiments of this invention the synthetic hydrocarbons are branched chain oligomers synthesized from one or more oligomers containing a $C_2$ to $C_{10}$ chain length and wherein the oligomers have an average molecular weight of 200 to 600. In each instance the synthetic hydrocarbon mixture must have performance and viscosity characteristics that permit functional utility as a drilling fluid or as a component of a water based drilling fluid. In its broadest form the synthetic hydrocarbon mixture should have a viscosity of from 1.0 to 6.0 centiStokes, preferable a viscosity of from 1.5 to 4.0 centiStokes and most preferably from 1.5 to 3.5 centiStokes. The synthetic hydrocarbons of the present invention is non-hydrogenated (unsaturated).

Oils such as diesel or mineral oils produced directly or indirectly from petroleum crude oil have traditionally been used as the oil components for water based drilling fluids. These oils contain a large variety of hydrocarbon compounds including aromatics and straight chain paraffins. The absence of these and the uniformity of the carbon numbers distinguish the synthetic hydrocarbon oils of this invention from petroleum derived oils.

The synthetic hydrocarbon oils of this invention are manufactured by oligomerizing alpha-olefins or other olefins. The resulting oils are mixtures of branched hydrocarbon molecules with carbon numbers that are even multiples of the base olefin. For instance, a synthetic hydrocarbon oil made from $C_8$ olefins contains only molecules that are $C_8$, $C_{16}$, $C_{24}$, $C_{32}$, etc. These oils can be hydrogenated to achieve complete saturation, or partially hydrogenated, or left unhydrogenated. Preferably they contain no aromatics. Since these oils are synthetic materials, their molecular size and structure, and hence their performance characteristics, can be controlled in a predictable and understandable manner. It is also possible to use mixtures of these oils and also oil synthesized from combinations of olefins.

Unsaturated hydrocarbons contain a double carbon to carbon bond. This double bond is a molecular reactive site. Saturated hydrocarbons, by definition, do not contain a double carbon to carbon bond, thus, saturated hydrocarbons are more stable than unsaturated hydrocarbons.

Synthetic oils are normally hydrogenated to eliminate residual molecular reactive sites. Reactive sites are usually left in a molecule only when 1) they cannot be eliminated; 2) they are low enough in reactivity as to not react at room temperature; or 3) the intended use of the material involves subsequent chemical reactions.

With olefinic materials, hydrogenation is the most common treatment to eliminate unwanted residual reactivity. Hydrogenation is the process of adding two hydrogen molecules across residual double bonds. While this is not normally a ultra-hazardous process, it does involve the use of hydrogen at high temperatures and pressures.

The double bond(s) left by elimination of the hydrogenation step in the normal synthesis of synthetic hydrocarbons by alphaolefin polymerization is subject to chemical reactions. This bond may be attacked directly by acidic species and the adjacent carbons with their partial positive charge are subject to attack by basic species. In actuality, however, significant reactions of the double bond, occur only at very high temperatures, i.e. 500° F., such as are ordinarily found in steel to steel lubrication applications. Automobile engine lubrication is such an application. Drilling and spotting fluids are normally not subject to such extreme temperatures.

The hydrogenation step in the synthesis of the more "stable" hydrogenated hydrocarbons mentioned in the prior art and industry literature is a material and significant contributor to the overall cost of synthetic hydrocarbon production. Its elimination will result in a material and significant cost savings in the production of non-hydrogenated synthetic hydrocarbons.

Experimental application of the invention has shown no material loss of favorable properties and no manifestations of materially unfavorable properties due to the use of non-hydrogenated synthetic hydrocarbons instead of hydrogenated synthetic hydrocarbons. Performance of the two materials has been materially equivalent. Functionally equivalent use of hydrogenated and unhydrogenated oils has not heretofore been thought possible.

The subject synthetic hydrocarbons are pure and minimally toxic to aquatic plant and animal life. The primary embodiment of this invention includes drilling fluids in which the synthetic hydrocarbon oil is emulsified in the aqueous phase of a water based drilling fluid.

The drilling fluid compositions of this invention are improved compositions for use offshore and onshore due to their minimal toxicity. These compositions are stable drilling fluids which are effective replacements for conventional muds containing petroleum derived oils. Mysid shrimp are used in bioassay tests of laboratory prepared drilling fluids containing the synthetic hydrocarbons and have shown excellent survivability.

The improved drilling fluid of this invention exhibits many of the functional characteristics of an oil based drilling fluid and the environmental compatibility of most water based drilling fluids. Specifically, the improved drilling fluid of this invention is characterized by improved toxicity and pollution characteristics in comparison to conventional oil based drilling fluids and specifically improved lubricity and wellbore stability in comparison to water based drilling fluids.

In alternate embodiments of this invention, the improved drilling fluid is used as a spotting fluid to free the drillstring when differential sticking occurs. The non-hydrogenated synthetic hydrocarbon may comprise the continuous phase of such spotting fluid. The improved drilling fluid can include wetting agents, viscosifiers and other materials common to the development and formulation of drilling fluids.

DESCRIPTION OF THE PREFERRED EMBODIMENT

The present invention relates to minimally toxic water based drilling fluids utilizing synthetic hydrocarbon additives which are functionally capable of carrying out additional wellbore functions such as a spotting fluid, packer-fluid, completion fluid, workover fluid and coring fluid. The drilling fluid compositions of the present invention can be modified according to the end use of the fluid using suitable emulsifiers, viscosifiers, density materials and suspending agents.

The following table indicates the preferred olefinic compounds from which the branched chain oligomeric and polymeric synthetic hydrocarbon oils can be manufactured.

| Carbon Atoms | Compound |
|---|---|
| $C_2$ | Ethylene |
| $C_3$ | Propene |
| $C_4$ | Butene-1, Isobutene |
| $C_5$ | Pentene |
| $C_6$ | Hexene |
| $C_7$ | Heptene |
| $C_8$ | Octene |
| $C_9$ | Nonene |
| $C_{10}$ | Decene |
| $C_{12}$ | Dodecene |
| $C_{13}$ | Tridecene |
| $C_{14}$ | Tetradecene |

Various synthetic hydrocarbons are commercially available to be used in the present invention. For example, polypropenes from AMOCO Chemical Company, product numbers #9009 and 9011; and Chevron Chemical Company's product identified as Polymer-560; polybutenes Indopol L-14 and H-15 offered by AMOCO Chemical Company, as well as mixtures comprising dimeric, trimeric and tetrameric oligomers of 1-decene from Emery, Mobil, Ethyl and Chevron Corporations are suitable for the present invention. These synthetic hydrocarbon oils can also be blended to achieve the desired chemical characteristics, which are determined according to the end use of the product.

As identified hereinbefore the synthetic hydrocarbons that are believed to be useful in the practice of this invention are characterized by chain length and molecular weight parameters. Useful synthetic hydrocarbon oils consist of branched chain oligomers synthesized from one or more olefins containing a $C_2$ to $C_{14}$ chain length and wherein the oligomers have an average molecular weight of from 120 to 1000. In the preferred embodiments of this invention the synthetic hydrocarbons are branched chain oligomers synthesized from one or more olefins containing a $C_2$ to $C_{12}$ chain length and wherein the oligomers have an average molecular weight of from 160 to 800. In the most preferred embodiments of this invention the synthetic hydrocarbons are branched chain oligomers synthesized from one or more oligomers containing a $C_2$ to $C_{10}$ chain length and wherein the oligomers have an average molecular weight of 200 to 600.

In each instance the synthetic hydrocarbon mixture must have performance and viscosity characteristics that permit functional utility as a drilling fluid. In its broadest form the synthetic hydrocarbon or hydrocarbon mixture should have a viscosity of from 1.0 to 6.0 centiStokes, preferable a viscosity of from 1.5 to 4.0 centiStokes and most preferably from 1.5 to 3.5 centiStokes. The synthetic hydrocarbons of the present invention are non-hydrogenated. For safety at the well site the flashpoint of the oil should exceed 150° F. and preferably exceed 200° F.

The interfacial tension between oil and water is very high, so if the liquids are mixed together they mechanically separate immediately when the agitation ceases, to minimize the interfacial area. Lowering the interfacial tension with a surfactant enables one liquid to form a stable dispersion of fine droplets in the other. The lower the interfacial tension, the smaller the droplets and the more stable the emulsion. In most emulsions, oil is the dispersed phase and water is the continuous phase. However, in "invert emulsions" in which water is the dispersed phase, a suitable emulsion can be formed upon the use of a suitable emulsifier.

Whether an oil-in-water or water-in-oil emulsion is formed depends on the relative solubility of the emulsifier in the two phases. Thus, a preferentially water soluble surfactant, such as sodium oleate, will form an oil-in-water emulsion because it lowers the surface tension on the water side of the oil-water interface, and the interface curves toward the side with the greater surface tension, thereby forming an oil droplet enclosed by water. On the other hand, calcium and magnesium oleates are soluble in oil, but not in water, and thus form water-in-oil emulsions.

An oil in water emulsion has water as the continuous phase. When added to the water based drilling fluid, the synthetic hydrocarbon of this invention may comprise up to 30% by weight of the total composition. The addition of the synthetic hydrocarbon oil to the water based mud improves the lubricity and shale stability characteristics of the mud.

The improved water based drilling fluid embodiment of this invention requires emulsifiers to incorporate the synthetic hydrocarbon phase into the brine or water continuous phase. Various emulsifiers are available for this application. The emulsifiers are chemical compounds which have both oleophilic and hydrophilic parts. The emulsifiers of this embodiment are alkyl aryl sulfonates, alkyl aryl sulfates, ethoxylated fatty acids, ethoxylated phenols, polyoxyethylene fatty acids, esters, ethers and combinations thereof. Blends of these materials as well as other emulsifiers can be used for this application.

A variety of additives can be included in the aqueous based drilling fluid of this invention. Specifically, materials generically referred to as gelling materials, thinners and fluid loss control agents are typically added to aqueous based drilling fluid formulations. Of these additional materials each can be added to the formulation in a concentration as rheologically and functionally required by drilling conditions. Typical of gel materials used in aqueous based drilling fluids are high molecular weight polymers such as PHPA, bentonite and salt gel.

Similarly, it has been found beneficial to add lignosulfonate as thinners for aqueous based drilling fluids. Typically lignosulfonates, modified lignosulfonates, polyphosphates and tannins are added. In other embodiments low molecular weight polyacrylates can also be added as thinners. Thinners are added to a drilling fluid to reduce flow resistance and gel development. Other functions performed by thinners include to reduce filtration and cake thickness, to counteract the effects of salts, to minimize the effects of water on the formations drilled, to emulsify oil in water, and to stabilize mud properties at elevated temperatures.

Finally, fluid loss control agents such as modified lignite, polymers and modified starches and cellulose can be added to the aqueous based drilling fluid system.

An invert water-in-oil emulsion has oil as the continuous phase. Water, usually in the form of brine, is normally added in these compositions. Water may be added to the drilling fluid up to a volume of 70%. These brines contain salts such as NaCl and/or $CaCl_2$ in varying amounts ranging up to 40% by weight.

The spotting fluid embodiment of this invention requires emulsifiers to incorporate the brine or water phase into the synthetic hydrocarbon continuous phase. Various emulsifiers are available for this application. The emulsifiers that have demonstrated utility in the emulsions of this embodiment are fatty acids, soaps of fatty acids, and fatty acid derivatives including amidoamines, polyamides, polyamines, esters (such as sorbitan monoleate polyethoxylate, sorbitan dioleate polyethoxylate) imidazolines, alcohols and combinations or derivatives of the above. Blends of these materials as well as other emulsifiers can be used for this application. Versacoat ®and Versacoat ® N.S. are emulsifiers manufactured and distributed by M-I Drilling Fluids Company.

The spotting fluid compositions of this invention may contain an additional chemical known as a wetting agent. Various wetting agents are available and can be included in the compositions. The wetting agents included, but not limited to the present invention, are fatty acids, crude tall oil, oxidized crude tall oil, organic phosphate esters, modified imidazolines and amidoamines, alkyl aromatic sulfates and sulfonates and the like and combinations or derivatives of the above. Versawet ® and Versawet ® NS are wetting agents manufactured and distributed by M-I Drilling Fluids Company.

Organophilic clays, normally amine treated clays, are also used as viscosifiers in the spotting fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 10% by weight range are sufficient for most applications. VG-69 is an organoclay material distributed by M-I Drilling Fluids Company.

The water based drilling fluid and spotting fluid compositions of this invention may optionally contain a weight material. The quantity depends upon the desired density of the final composition. The preferred weight materials include, but are not limited to, barite, iron oxide, calcium carbonate and the like. The weight material is typically added to result in a drilling fluid density of up to 24 pounds per gallon, preferably up to 21 pounds per gallon and most preferably up to 19.5 pounds per gallon.

Finally, fluid loss control agents such as modified lignites and polymers can be added to the drilling fluid system of this invention.

The following examples are submitted for the purpose of illustrating the toxicity and performance characteristics of the unsaturated synthetic hydrocarbons of this invention. These tests were conducted in accordance with the procedures in API Bulletin RP 13B-2, 1990. The following abbreviations are sometimes used in describing the results of experimentation:

"PV" is plastic viscosity which is one variable used in the calculation of viscosity characteristics of a drilling fluid.

"YP" is yield point which is another variable used in the calculation of viscosity characteristics of drilling fluids.

"GELS" is a measure of the suspending characteristics and the thixotropic properties of a drilling fluid.

"ES" is the term used to indicate the stability of an emulsion.

EXAMPLE 1

To determine the toxicity of the synthetic hydrocarbons which have been identified as exhibiting the desired performance characteristics in the present invention, tests were conducted on water soluble fractions of the synthetic hydrocarbons and the results compared to state of the art oils. The conclusions regarding toxicity were based on a determination and comparison of the concentration of the synthetic hydrocarbon in the aqueous phase which is lethal to 50% of live test organisms after 96 hours of continuous exposure. The aquatic animals used in the tests were mysid shrimp (Mysidopsis Bahia). The detailed procedure on the testing method is found in "Duke, T. W., Parrish, P. R., etc. "Acute Toxicity of Eight Laboratory Prepared Generic Drilling Fluids to Mysids (Mysidopsis Bahia)", 1984 EPA-600/3-84-067.

Bioassays were conducted using the suspended particulate phase ("SPP") of the drilling mud following the U.S. Environmental protection Agency protocol in Appendix 3 of "Effluent Limitation Guidelines and New Source Performance Standards: Drilling Fluids Toxicity Test", Federal Register Vol. 50, No. 165, 34631–34636. the SPP is the unfiltered supernatant extracted from a 1:9 mixture of the test fluid and seawater which is allowed to settle for one hour. Synthetic seawater was used in preparing the SPP and the test negative controls. The 1:9 test sample/seawater slurry was prepared by stirring without aeration, 300 ml of the mud with 2700 ml of seawater in a clean, one gallon glass container for five minutes. The pH of the slurry was measured and adjusted to within 0.2 pH units of the seawater using 6N HCl. The slurry was then allowed to settle for one hour and the supernatant (SPP) was decanted. Aeration was not supplied to the 100% SPP since the dissolved oxygen level was more than 65% of saturation. The pH of the SPP was measured and further adjusted with 10% HCl. The definitive bioassay was conducted using the SPP. The definitive bioassay was initiated on test samples using test solutions of 20%, 10%, 5%, 1% and 0.5% SPP.

For the definitive test, 20 mysids were added to each of the concentrations of test solution (SPP) and to a seawater control. Water quality was measured and observations of the test animals were made at 24 hour intervals. After 96 hours, the test was terminated. A standard control test was also conducted utilizing the same test methods as used for the drilling mud. However, sodium dodecyl sulfate (95% pure) was used for the five test substance concentrations. The results of the bioassays are given in the following table as the $LC_{50}$ value for 96 hours.

| Trade Name | Generic Description | M.W. | $LC_{50}$ |
|---|---|---|---|
| Amoco - 9009 | polypropene | 400 | $>1 \times 10^6$ ppm |
| Indopol L-14 | polybutene | 320 | $>1 \times 10^6$ ppm |

-continued

| Trade Name | Generic Description | M.W. | $LC_{50}$ |
|---|---|---|---|
| X-10 | polypropene | 310 | 914,650 ppm |
| Emery 3002 | oligomeric decene | 290 | 574,330 ppm |
| P-560 | polypropene | 198 | 30,000 ppm |
| PT-12 | polypropene | 170 | 10,800 ppm |
| Diesel Oil #2 | diesel oil | — | 1,599 ppm |
| LVT-Conoco | mineral oil | — | <13,245 ppm |
| Isopar M (Exxon) | petroleum product | | <30,000 ppm |

The above table indicates that the synthetic hydrocarbons of this invention are non-toxic when compared with the present state of the art oils used in making oil based muds. All of these oils were tested in generic mud #7 at 2% concentration.

EXAMPLE 2

In still another embodiment of the invention, a waterless drilling fluid composition using the synthetic hydrocarbon of this invention was made for application in coring fluids and packer fluids. The following composition was used in preparation of a waterless drilling fluid.

| Composition 1 | |
|---|---|
| Polybutene (L-14) | 236 grams |
| VERSAWET | 2 grams |
| Organoclay (VG-69) | 4 grams |
| Viscosifier (Polyamide) | 8 grams |
| Barite | 270 grams |

The following rheological data before and after heat aging at 200° F. for 16 hours were obtained. The rheology was determined at 120° F.

| | Rheology at 120° F. | |
|---|---|---|
| | Initial | Heat Aged 250° F. for 16 Hours |
| PV | 47 | 59 |
| YP | 8 | 12 |
| GELS | 4/8 | 7/10 |

The following data shows the effect of pressure on viscosity of a 2 cSt synthetic hydrocarbon oil compared to a typical mineral oil. The data shows that as the pressure increases, the viscosity of the base oil increases. It can be observed that at ambient pressure, the viscosity of the synthetic material is slightly higher. However, at 8,000 psi the viscosity of the two materials is about equal. This confirms that there are no unexpected viscosity humps when using this synthetic material.

EXAMPLE 3

| | Huxley Bertram Viscosity at 78° F. | | |
|---|---|---|---|
| Pressure (psi) | Mineral Oil | Synthetic Oil | 2nd Test |
| 0 | 5.2 | 7.1 | 6.0 |
| 2000 | 6.3 | 8.1 | 11.5 |
| 4000 | 8.4 | 9.9 | 11.7 |
| 6000 | 10.0 | 14.1 | 12.6 |
| 8000 | 12.8 | 13.1 | 13.3 |

EXAMPLE 4

The following two formulations were made from Polybutene L-14 for application in preparing spotting fluid.

| | Parts by Weight |
|---|---|
| Composition 2 | |
| Polybutene (L-14) | 96 |
| Alkaterge-T (Cationic Surfactant) | 1 |
| Wool Grease | 1 |
| Isopropyl alcohol | 2 |
| Composition 3 | |
| Polybutene (L-14) | 98 |
| Anionic Surfactant blend (fatty acid, 10-ethoxylate nonylphenol, ethoxylated fatty acid ester) | 2 |

The above fluids were used in cake-cracking efficiency index testing to establish the utility of the fluid in spotting fluid application.

The cake-cracking index experiments were carried out according to the methods described in U.S. Pat. No. 3,217,802. The following outlines the procedure.

1. Stir base mud 5–10 minutes and run 30 minutes fluid loss in an API cell.
2. Observe the fluid loss (about 20 cc typical) and empty the cell by pouring from the hole in the top of the cell. Discard the mud.
3. Add 50 to 60 cc of the test sample of spotting fluid into the cell from the hole on the top.
4. Run API fluid loss (100 psi for 30 minutes).
5. Record the fluid losses and pour out any residual spotting fluid from the opening on the top of the cell.
6. Carefully open each cell and observe appearance of filter cakes. Determine the cake-cracking efficiency using the procedure outlined in U.S. Pat. No. 3,217,802.

Water-Base Mud Preparation

1. Add 0.7 grams MAGCOPHOS to 2114 cc of warm tap water in a gallon plastic jug and stir 5 minutes at 3500 RPM.
2. Add 64.7 grams of bentonite gel and stir 5 minutes.
3. Add 130.2 grams X-ACT clay and stir 5 minutes.
4. Add 112.7 grams SALT GEL then add 5.25 grams MCQUEBRACHO and 3–5 cc of 50% NaOH and stir 10 minutes at 4000–6000 RPM.
5. Slowly add 840 grams Battle Mountain barite and stir 30 minutes at 800 RPM.

| Base-Mud Properties | |
|---|---|
| Apparent Viscosity | 18 |
| API Fluid Loss | 20 cc |
| pH | 9.6 |

The cake-cracking index for the above mentioned fluid was 0.85 in Composition 2 and 1.0 in Composition 3. A cake-cracking index of zero means no cake-cracking and unuseful. A cakecracking index of 1.0 is maximum and is excellent for a spotting fluid for freeing the stuck pipe.

In the other embodiments of the invention, the synthetic hydrocarbons of this invention can also be used in water based muds.

These synthetic hydrocarbons are normally emulsified in water as oil-in-water emulsions using various known surfactants. These minimally toxic synthetic hydrocarbons can be mixed with a water based mud in 0.5% to as much as 50% or more. These synthetic hydrocarbons, when used in water based mud formulations, give low coefficient of friction values thus acting as a lubricating fluid. In addition, these modified water based drilling fluids containing emulsified synthetic hydrocarbons provides shale swelling inhibition and high temperature rheological stability.

The following drilling fluid compositions were made using field water based mud and synthetic hydrocarbons and evaluated for their rheological properties.

EXAMPLE 5

| INITIAL PROPERTIES AT ROOM TEMPERATURE | | | |
|---|---|---|---|
| | Base-Mud | Base-Mud +%5 L-14 | Base-Mud +10% L-14 |
| 600 | 72 | 75 | 82 |
| 300 | 40 | 45 | 47 |
| PV | 32 | 30 | 35 |
| YP | 8 | 15 | 12 |
| GELS | 3/3 | 4/4 | 4/5 |
| Heat Aged at 250° F. for 116 Hours | | | |
| 600 | 76 | 74 | 86 |
| 300 | 38 | 40 | 49 |
| PV | 38 | 34 | 37 |
| YP | 0 | 6 | 12 |
| GELS | 2/2 | ¾ | 4/5 |

The above Example 5 establishes that the water based muds with 5% and 10% synthetic oil content possess improved rheological properties, especially after heat aging at 250° F. These muds do not stick to the Hamilton Beach impellers and/or VG-Meter sleeves. These properties establish the anti-sticking properties of the drilling and compositions containing synthetic hydrocarbons of this invention.

EXAMPLE 6

Lubricity Evaluation 22.5 pounds per barrel prehydrated bentonite gel slurry was used to evaluate the lubricity efficiency of synthetic hydrocarbons in water based fluids.

This gel slurry was evaluated using both Baroid's lubricity meter and the LEM brand lubricity meter with and without synthetic hydrocarbons. The coefficient of frictions were recorded.

| | 22.5 pub Bentonite gel slurry | 22.5 pub gel slurry with 5% synthetic hydrocarbon oil |
|---|---|---|
| Baroid Lubricity Meter Coefficient of Friction | 50+ | 25.5 |
| LEM Meter Coefficient of Friction | 0.54 | 0.21 |

The results of Examples 1–6 clearly demonstrate that the synthetic hydrocarbon oils of this invention are functionally effective in drilling fluid applications while remaining environmentally compatible.

What is claimed is:

1. An improved water based drilling fluid, characterized by minimal toxicity to plant and aquatic life and environmental compatibility, said improved drilling fluid comprising:

a. an aqueous continuous phase;

b. an oil-in-water emulsifier; and c. an unhydrogenated synthetic hydrocarbon, said synthetic hydrocarbon having a molecular weight of from about 120 to about 1000 and wherein said synthetic hydrocarbon is synthesized from one or more olefinic monomers having a chain length of $C_2$ to $C_{14}$.

2. The improved water based drilling fluid of claim 1 wherein said unhydrogenated synthetic hydrocarbon oil comprises branched chain oligomers synthesized from one or more olefins containing a $C_2$ to $C_{12}$ chain length and wherein the oligomers have an average molecular weight of from 60 to 800.

3. The improved water based drilling fluid of claim 1 wherein said unhydrogenated synthetic hydrocarbon oil comprises branched chain oligomers synthesized from one or more oligomers containing a $C_2$ to $C_{10}$ chain length and wherein the oligomers have an average molecular weight of 200 to 600.

4. The improved water based drilling fluid of claim 1 wherein the viscosity of said oil is from 1.0 to 6.0 centiStokes when measured at 212° F.

5. The improved water based drilling fluid of claim 1 wherein said oil-in-water emulsifier is selected from the group consisting of: alkyl aryl sulfonates, alkyl aryl sulfates, ethoxylated phenols, polyoxyethylene fatty acids, esters, ethers and combinations or derivatives thereof.

6. The improved water based drilling fluid of claim 5 wherein said emulsifier is present at a concentration of up to 10% by weight.

7. The improved water based drilling fluid of claim 1 wherein said unhydrogenated synthetic hydrocarbon is present in a concentration of up to 30% by weight.

8. The improved water based drilling fluid of claim 7 wherein the olefinic monomers of said synthetic hydrocarbon are selected from the group consisting of unhydrogenated oligomers of: ethylene, propene, butene-1, isobutene, hexene, heptene, octene, nonene, decene, dodecene and combinations thereof.

9. The improved water based drilling fluid of claim 1 wherein said synthetic hydrocarbon is polybutene.

10. An improved water based drilling fluid characterized by minimal toxicity to plant and aquatic life and environmental compatibility, said improved drilling fluid comprising:

a. an aqueous continuous phase;

b. an oil-in-water emulsifier present at a concentration of up to 10% by weight; and c. an unhydrogenated synthetic hydrocarbon having a molecular weight of from about 120 to about 1000 and wherein said synthetic hydrocarbon is synthesized from one or more olefinic monomers having a carbon chain length of from $C_2$ to $C_{14}$, and wherein said synthetic hydrocarbon is present at a concentration of up to 30% by weight.

11. The improved water based drilling fluid of claim 10 wherein said synthetic hydrocarbon oil comprises branched chain oligomers synthesized from one or more olefins containing a $C_2$ to $C_{12}$ chain length and wherein the oligomers have an average molecular weight of from 160 to 800.

12. The improved water based drilling fluid of claim 10 wherein said synthetic hydrocarbon oil comprises branched chain oligomers synthesized from one or more oligomers containing a $C_2$ to $C_{10}$ chain length and wherein the oligomers have an average molecular weight of 200 to 600.

13. The improved water based drilling fluid of claim 10 wherein the viscosity of said oil is from 10 to 6.0 centiStokes when measured at 212° F.

14. The improved water based drilling fluid of claim 10 wherein said oil-in-water emulsifier is selected from the group consisting of: alkyl aryl sulfonates, alkyl aryl sulfates, ethoxylated phenols, polyoxyethylene fatty acids, esters, ethers and combinations or derivatives thereof.

15. The improved water based drilling fluid of claim 10 wherein the olefinic monomers of said synthetic hydrocarbon are selected from the group consisting of the unhydrogenated oligomers of: ethylene, propene, butene-1, isobutene, hexene, heptene, octene, nonene, decene, dodecene and combinations thereof.

16. An improved water based drilling fluid, characterized by minimal toxicity to plant and aquatic life and environmental compatibility, said improved drilling fluid comprising:

a. an aqueous continuous phase;

b. an oil-in-water emulsifier, said emulsifier being present in a concentration of up to 10% by weight; said emulsifier being selected from the group consisting of alkyl aryl sulfonates, alkyl aryl sulfates, ethoxylated phenols, polyoxyethylene fatty acids, esters, ethers and combinations or derivatives thereof; and c. an unhydrogenated synthetic hydrocarbon having a molecular weight of from about 120 to about 1000 and wherein said synthetic hydrocarbon is synthesized from one or more olefinic monomers having a carbon chain length of from $C_2$ to $C_{14}$; and wherein said synthetic hydrocarbon is present in a concentration of up to 30% by weight.

17. The improved water based drilling fluid of claim 16 wherein said unhydrogenated synthetic hydrocarbon oil comprises branched chain oligomers synthesized from one or more olefins containing a $C_2$ to $C_{12}$ chain length and wherein the oligomers have an average molecular weight of from 160 to 800.

18. The improved water based drilling fluid of claim 16 wherein said unhydrogenated synthetic hydrocarbon oil comprises branched chain oligomers synthesized from one or more oligomers containing a $C_2$ to $C_{10}$ chain length and wherein the oligomers have an average molecular weight of 200 to 600.

19. The improved water based drilling fluid of claim 16 wherein the viscosity of said oil is from 1.0 to 6.0 centiStokes when measured at 212° F.

20. The improved water based drilling fluid of claim 16 wherein the olefinic monomers of said unhydrogenated synthetic hydrocarbon are selected from the group consisting of: ethylene, propene, butene-1, isobutene, hexene, heptene, octene, nonene, decene, dodecene and combinations thereof.

21. An improved spotting fluid, characterized by minimal toxicity to plant and aquatic life and environmental compatibility, said improved spotting fluid comprising:

a. unhydrogenated synthetic hydrocarbon having a molecular weight of from about 120 to about 1000 and wherein said synthetic hydrocarbon is synthesized from one or more olefinic monomers having a chain length of from $C_2$ to $C_{14}$; and b. a functionally effective amount of a surfactant.

22. The improved spotting fluid of claim 21 wherein said synthetic hydrocarbon oil comprises branched chain oligomers synthesized from one or more olefins containing a $C_2$ to $C_{12}$ chain length and wherein the oligomers have an average molecular weight of from 160 to 800.

23. The improved spotting fluid of claim 21 wherein said synthetic hydrocarbon oil comprises branched chain oligomers synthesized from one or more oligomers containing a $C_2$ to $C_{10}$ chain length and wherein the oligomers have an average molecular weight of 200 to 600.

24. The improved spotting fluid of claim 21 wherein the viscosity of said oil is from 1.0 to 6.0 centiStokes when measured at 212° F.

25. The spotting fluid of claim 21 wherein said surfactant is selected from the group consisting of anionic and cationic surfactants.

26. The spotting fluid of claim 21 wherein said surfactant is present in a concentration of from about 0.5% to 5.0% by weight.

27. The improved spotting fluid of claim 21 wherein the olefinic monomers of said unhydrogenated synthetic hydrocarbon are selected from the group consisting of: ethylene, propene, butene-1, isobutene, hexene, heptene, octene, nonene, decene, dodecene and combinations thereof.

28. An improved spotting fluid, characterized by minimal toxicity to plant and aquatic life and environmental compatibility, said improved spotting fluid comprising:

a. an unhydrogenated synthetic hydrocarbon having a molecular weight of from about 120 to about 1000 and wherein said synthetic hydrocarbon is synthesized from one or more olefinic monomers selected from the group consisting of: ethylene, propene, butene-1, isobutene, hexene, heptene, octene, nonene, decene, dodecene and combinations thereof;

b. a surfactant, said surfactant being present in a concentration of from about 0.5% to about 5.0% by weight.

29. The improved spotting fluid of claim 28 wherein said synthetic hydrocarbon oil comprises branched chain oligomers synthesized from one or more olefins containing a $C_2$ to $C_{12}$ chain length and wherein the oligomers have an average molecular weight of from 160 to 800.

30. The improved spotting fluid of claim 28 wherein said synthetic hydrocarbon oil comprises branched chain oligomers synthesized from one or more oligomers containing a $C_2$ to $C_{10}$ chain length and wherein the oligomers have an average molecular weight of 200 to 600.

31. The improved spotting fluid of claim 28 wherein the viscosity of said oil is from 1.0 to 6.0 centiStokes when measured at 212° F.

* * * * *